United States Patent [19] [11] 4,266,583
Kirk et al. [45] May 12, 1981

[54] SPINDLE TURNING TOOL

[76] Inventors: Chester E. Kirk, 3537 NW. Mink Pl., Corvallis, Oreg. 97330; Owen E. Raab, 11825 Glendale Way South, Seattle, Wash. 98168

[21] Appl. No.: 94,544

[22] Filed: Nov. 15, 1979

[51] Int. Cl.³ .............................................. B23B 27/00
[52] U.S. Cl. ....................................... 142/56; 407/118
[58] Field of Search ........................ 142/56, 55, 48, 49; 407/83, 89, 90, 99, 101, 118, 46

[56] References Cited

U.S. PATENT DOCUMENTS

| | | | |
|---|---|---|---|
| 134,219 | 12/1872 | Richards | 142/56 |
| 850,874 | 4/1907 | Tripp | 142/56 |
| 897,576 | 9/1908 | Bocorselski | 407/89 |
| 1,478,300 | 12/1923 | Sage | 142/56 |
| 4,095,630 | 6/1978 | Kirk et al. | 142/56 |

*Primary Examiner*—Leonidas Vlachos
*Attorney, Agent, or Firm*—D. Paul Weaver

[57] ABSTRACT

A disc body portion is grooved diametrically in one end face to receive differently profiled spindle turning bits and the body portion has a central axial threaded bore to accept a bolt serving as a temporary handle to hold the cutting bits in contact with a grinding wheel to sharpen them. The unitized disc body portion and bits are held clampingly during use between two body members of a bar-like rockable wood lathe cutting tool with the threaded securing rod of such tool passing through the threaded bore of the disc body portion.

3 Claims, 4 Drawing Figures

FIG. 1
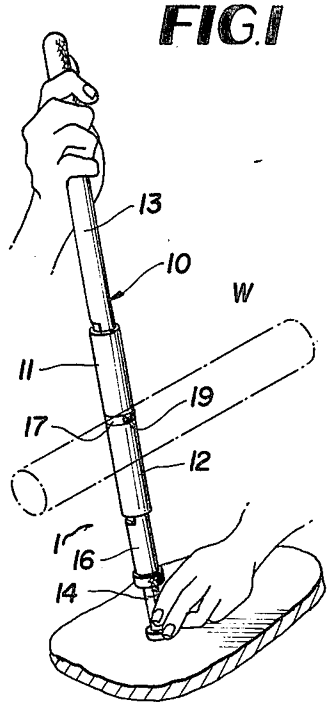
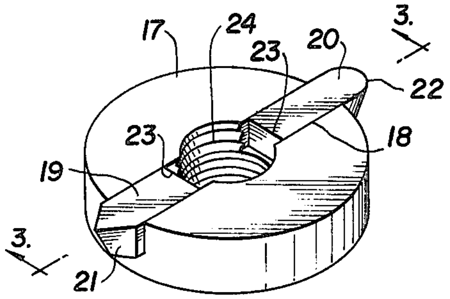
FIG. 2
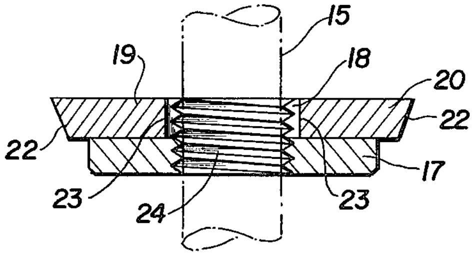
FIG. 3
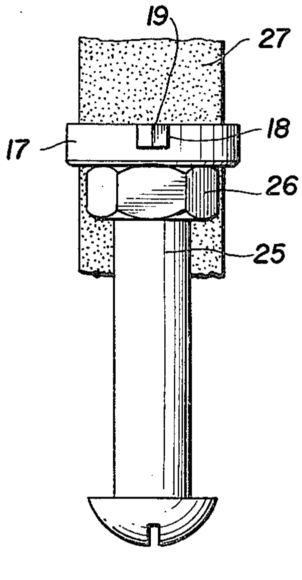
FIG. 4

SPINDLE TURNING TOOL

BACKGROUND OF THE INVENTION

The present invention seeks to improve on the utility of the wood lathe cutting tool disclosed in U.S. Pat. No. 4,095,630. In that patent, a unitized rigid bar-like tool or holder for a cutting bit unit has a rocker foot extension whereby the far end of the tool can be grasped and rocked in a vertical plane toward and from a rotating workpiece in a wood lathe.

A problem encountered with this type of turning tool is that the bit holder is necessarily small and therefore difficult to grasp and hold in contact with a grinding or sharpening stone. To overcome this problem, the present invention seeks to provide a cutting bit unit or holder particularly useful in turning wooden spindles which is constructed for versatility of use on the same type of tool disclosed in the above prior patent and also having means whereby the cutting bits can be conveniently and firmly held against the grinding stone to sharpen them periodically.

More particularly, in accordance with the invention, a comparatively thin disc body is diametrically grooved across one end face to receive in the groove a pair of differently profiled spindle turning bits which may be held in place by brazing or the like. Between the two bits at the center of the disc body, an axial threaded opening is formed therethrough to accept a bolt by means of which the bits can be held in firm contact with a grinding wheel to sharpen them while the disc body is separated from the bar-like wood lathe cutting tool. The threaded opening in the disc body also receives the securing rod of the wood lathe cutting tool during the use of the invention for turning spindles and the like. The arrangement is highly convenient, efficient and economical and renders the tool in the above-referenced patent considerably more useful without any increase in its manufacturing cost.

BRIEF DESCRIPTION OF THE DRAWINGS

FIG. 1 is a perspective view of the invention illustrating its use.

FIG. 2 is an enlarged perspective view of a spindle turning bit holder or unit forming the main subject matter of the invention.

FIG. 3 is a vertical section taken on line 3—3 of FIG. 2.

FIG. 4 is a side elevation of the bit holder unit in assembled relationship with a supporting bolt which is held to enable sharpening of the cutting bits.

DETAILED DESCRIPTION

Referring to the drawings in detail, the numeral 10 in FIG. 1 designates a wood lathe cutting tool essentially in accordance with the disclosure in U.S. Pat. No. 4,095,630. The tool includes central clamping body members 11 and 12, an upper handle 13 and an adjustable rocker foot 14. An internal threaded rod 15, not shown in FIG. 1, has screw-threaded engagement at one end with the handle member 13 and at its other end with a lower section 16 which carries the adjustable rocker foot 14. When the elements 13 and 16 are tightened in relation to the threaded securing rod, the two intermediate body members 11 and 12 are drawn into axial clamping engagement with the tool bit holder positioned between them, as shown in said patent.

In the present invention, the tool bit holder or unit for use on the described cutting tool 10 embodies a comparatively thin disc body 17 provided in one flat end face with a diametrical groove 18 within which are seated two cutting bits 19 and 20 used for turning wood spindles and the like. The cutting tips of the bits 19 and 20 extend radially of the disc body 17 and are differently profiled at their outer ends such as pointed and beveled as indicated at 21 and rounded as at 22. The top faces of the bits 19 and 20 are flush with the top face of disc body 17 and their inner ends are disposed outwardly of the axial center of the disc body as shown at 23. The two bits 19 and 20 are fixed within the groove 18 by brazing or by other known techniques. Preferably the bit receiving groove 18 extends for more than one-half of the thickness of the disc body 17 in depth, but the depth of the groove 18 is a variable as is the thickness of the disc body and may change to meet particular needs.

The disc body 17 is further provided with a central axial screw-threaded through opening 24 which is large enough to permit the passage therethrough of the securing rod 15 of tool 10 when the invention is in use. The threaded opening 24 is also capable of receiving a threaded bolt 25 carrying a locking nut 26, FIG. 4, to facilitate holding the disc body 17 by hand when sharpening the bits 19 and 20 by bringing their profiled tips into contact with a grinding or sharpening wheel 27. The bolt 25 forms a convenient handle at this time which greatly simplifies and renders more accurate and efficient the sharpening of the small bits. When the bolt 25 has served its purpose as a temporary handle, the lock nut 26 is loosened and the bolt is separated from the disc body 17, and the latter with the sharpened bits 19 and 20 is placed in the lathe tool 10 between the two body members 11 and 12 in the previously-described manner with the cutting bits 19 and 20 properly positioned to cut or form spindles from wooden workpieces in a lathe, such as the workpiece W shown in phantom lines in FIG. 1.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. For use in a wood lathe cutting tool of the rockable bar type having clamping body members adapted to hold between them a cutting bit unit in a use position, a disc body provided in one end face with a diametrical groove, a pair of radially extending profiled cutting bits fixed in said groove with their profiled cutting tips projecting radially of the periphery of the disc body, and the disc body having a central threaded through opening adapted to receive therethrough an internal securing rod of said lathe cutting tool and also adapted for engagement with a threaded bolt, said bolt forming a temporary handle for the disc body during sharpening of the profiled cutting bits.

2. For use in a wood lathe cutting tool as defined in claim 1, and said diametrical groove being sufficiently deep to locate corresponding faces of said cutting bits flush with the end face of the disc body having said groove.

3. A tool bit unit for use in a rockable bar-type wood lathe cutting tool, said unit comprising a disc body having a central axial threaded bore and an end face diametrical groove intersecting the threaded bore, and a pair of profiled cutting bits fixedly mounted in said groove with their profiled cutting portions extending radially outwardly of the disc body and their interior ends lying slightly outwardly of the threaded bore, corresponding side faces of the cutting bits being flush with the end face of the disc body having said groove.

* * * * *